United States Patent
Estevez

(10) Patent No.: US 10,917,223 B2
(45) Date of Patent: Feb. 9, 2021

(54) APPARATUS AND METHOD FOR INTERFERENCE MANAGEMENT IN WIRELESS COMMUNICATION SYSTEM

(71) Applicant: Samsung Electronics Co., Ltd., Suwon-si (KR)

(72) Inventor: David Gutierrez Estevez, Staines Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 16/338,590

(22) PCT Filed: Sep. 29, 2017

(86) PCT No.: PCT/KR2017/011013
§ 371 (c)(1),
(2) Date: Apr. 1, 2019

(87) PCT Pub. No.: WO2018/066945
PCT Pub. Date: Apr. 12, 2018

(65) Prior Publication Data
US 2019/0238304 A1    Aug. 1, 2019

(30) Foreign Application Priority Data

Oct. 4, 2016 (GB) .................................. 1616863.5
Sep. 26, 2017 (KR) .......................... 10-2017-0124404

(51) Int. Cl.
*H04L 5/14* (2006.01)
*H04B 17/345* (2015.01)
(Continued)

(52) U.S. Cl.
CPC ............. *H04L 5/14* (2013.01); *H04B 17/345* (2015.01); *H04L 5/0073* (2013.01);
(Continued)

(58) Field of Classification Search
CPC ....... H04L 5/14; H04L 5/0073; H04B 17/345; H04W 72/0446; H04W 72/0426; H04W 84/045; H04W 88/08
See application file for complete search history.

(56) References Cited

U.S. PATENT DOCUMENTS 10,582,490 B2 *  3/2020  Seo ...................... H04W 72/14
2013/0272170 A1  10/2013  Chatterjee et al.
(Continued)

FOREIGN PATENT DOCUMENTS

EP    2840851 A1    2/2015
WO    2012158578 A1    11/2012
(Continued)

OTHER PUBLICATIONS

ISA/KR, "International Search Report and Written Opinion of the International Search Authority," International Application No. PCT/KR2017/011013, dated Dec. 22, 2017, 11 pages.
(Continued)

*Primary Examiner* — Melvin C Marcelo

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). A method for operating a base station in a wireless communication system comprises receiving a information on a time division duplex (TDD) configuration of another base station, determining a TDD configuration of the base station based on the TDD configuration of the another base station and transmission direction of reference signals, and transmitting a downlink signal and receiving an uplink signal according to the TDD configuration of the base station.

18 Claims, 8 Drawing Sheets

(51) Int. Cl.
*H04W 72/04* (2009.01)
*H04L 5/00* (2006.01)
*H04W 84/04* (2009.01)
*H04W 88/08* (2009.01)

(52) U.S. Cl.
CPC .... *H04W 72/0446* (2013.01); *H04W 72/0426* (2013.01); *H04W 84/045* (2013.01); *H04W 88/08* (2013.01)

(56) References Cited

U.S. PATENT DOCUMENTS

| | | |
|---|---|---|
| 2013/0322235 A1 | 12/2013 | Khoryaev et al. |
| 2014/0073343 A1 | 3/2014 | Nagaraja et al. |
| 2014/0086112 A1 | 3/2014 | Stern-Berkowitz et al. |
| 2014/0161001 A1 | 6/2014 | Gao et al. |
| 2014/0334353 A1 | 11/2014 | Wei |
| 2015/0043390 A1 | 2/2015 | Wang et al. |
| 2015/0173011 A1 | 6/2015 | Das et al. |
| 2015/0373550 A1 | 12/2015 | Hong et al. |

FOREIGN PATENT DOCUMENTS

| | | |
|---|---|---|
| WO | 2014110783 A1 | 7/2014 |
| WO | 2014165468 A1 | 10/2014 |
| WO | 2015014407 A1 | 2/2015 |

OTHER PUBLICATIONS

Intellectual Property Office, "Combined Search and Examination Report under Section 17 and 18(3)," Application No. GB1616863.5, dated Mar. 10, 2017, 7 pages.

3GPP TS 36.211 V13.2.0 (Jun. 2016), Technical Specification, 3rd Generation Partnership Project; Technical Specification Group Radio Access Network; Evolved Universal Terrestrial Radio Access (E-UTRA); Physical channels and modulation (Release 13), Jun. 2016, 170 pages.

Bjornson, Emil, et al., "Massive MIMO: Ten Myths and One Critical Question," IEEE Communications Magazine, IEEE, Feb. 2016, 10 pages.

Fernandes, Fabio, et al., "Inter-Cell Interference in Noncooperative TDD Large Scale Antenna Systems," IEEE Journal on Selected Areas in Communications, vol. 31, No. 2, Feb. 2013, 10 pages.

Nokia, et al., "High-level principles for beam coordination and link adaptation in NR," R1-1610254, 3GPP TSG-RAN WG1 #86-BIS, Lisbon, Portugal, Oct. 10-14, 2016, 3 pages.

Pauli, Volker, et al., "Dynamic TDD for LTE-A and 5G," Nomor Research GmbH, Munich, Germany, Sep. 2015, 8 pages.

Deutsche Telekom AG, "5G Architecture Options—Full Set," RP-161266, Joint RAN/SA Meeting Jun. 14, 2016, Busan, 11 pages.

Rusek, Fredrik, et al., "Scaling Up MIMO," IEEE Signal Processing Magazine, Jan. 2013, 21 pages.

\* cited by examiner

[Fig. 1]
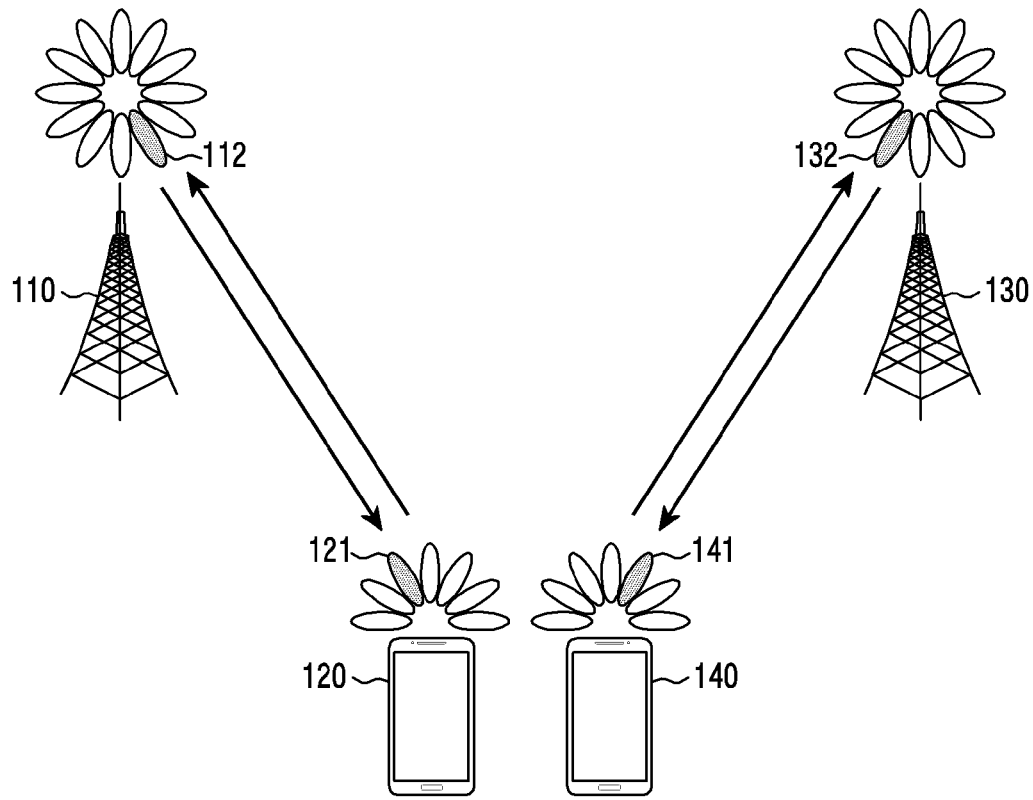
[Fig. 2]
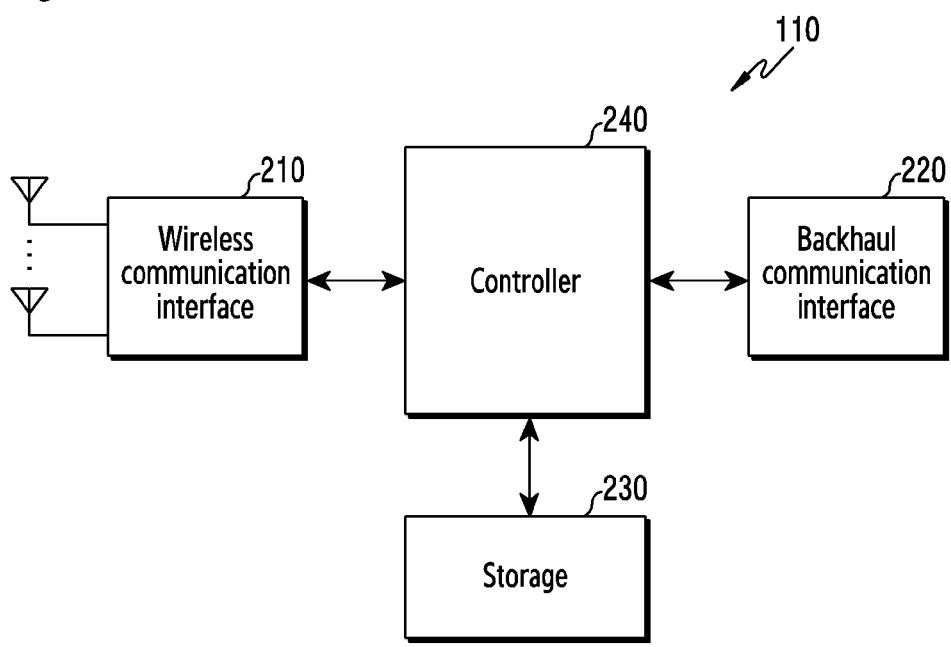

[Fig. 3]
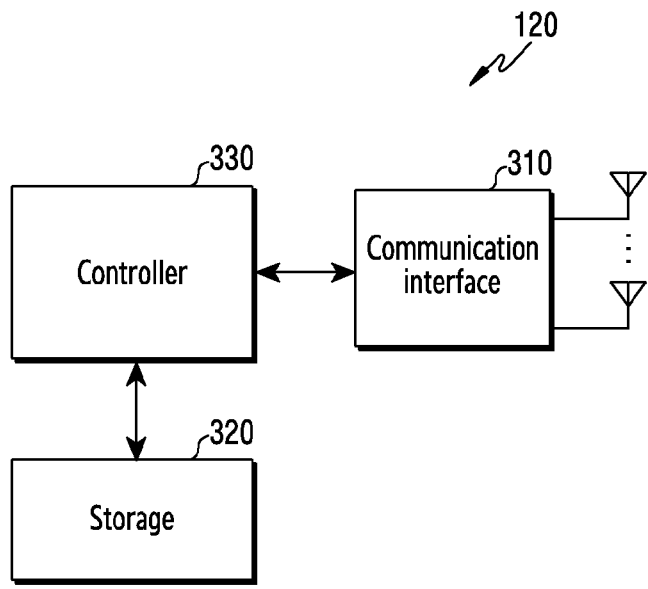
[Fig. 4]
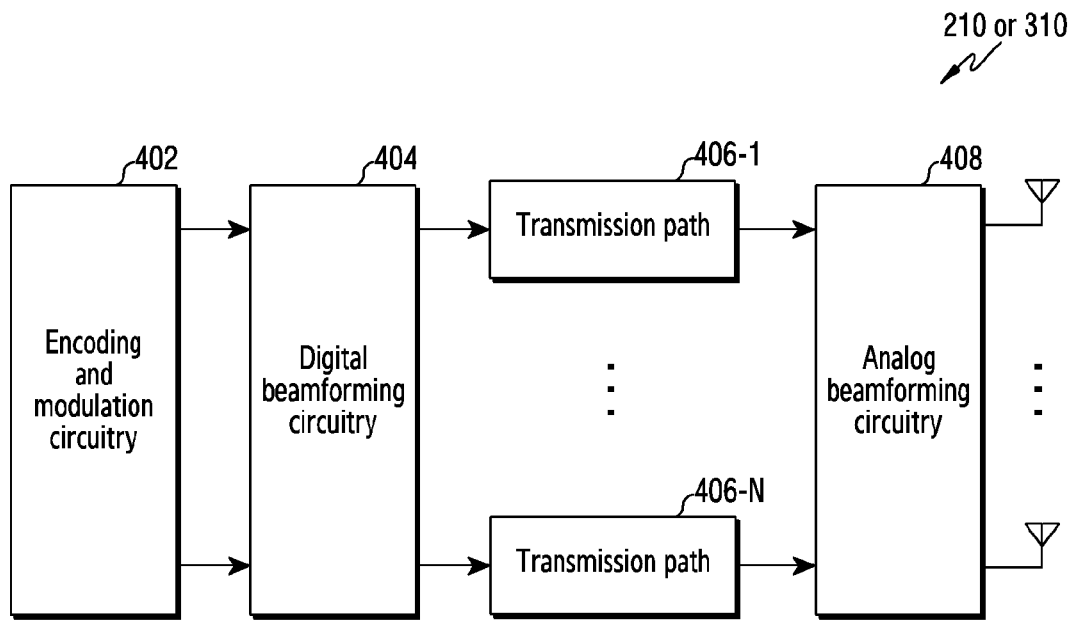

[Fig. 5]
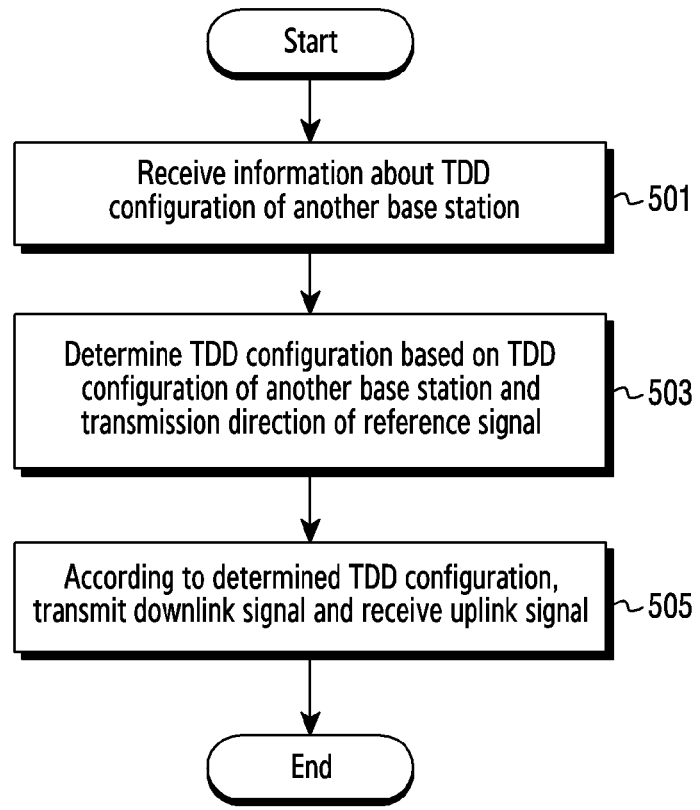

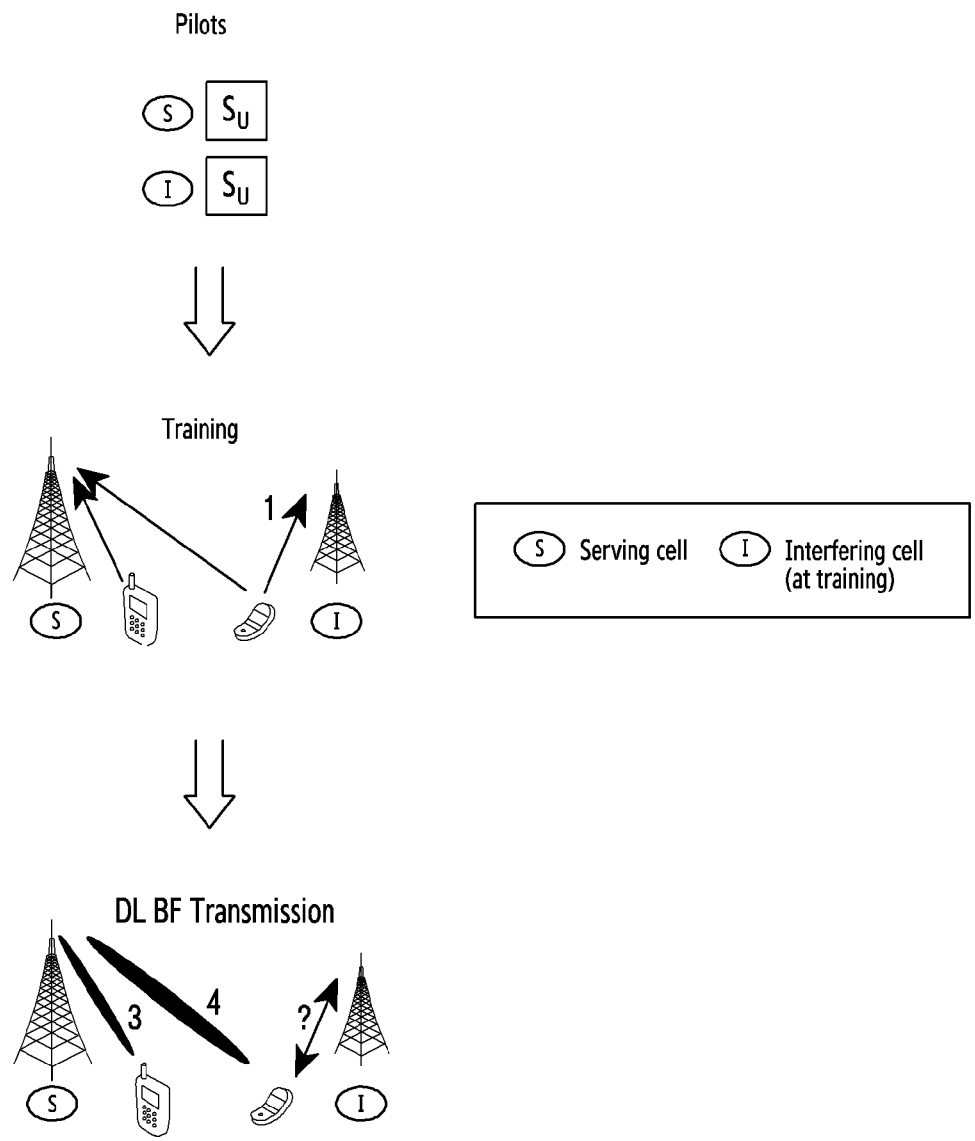
[Fig. 6]

[Fig. 7]
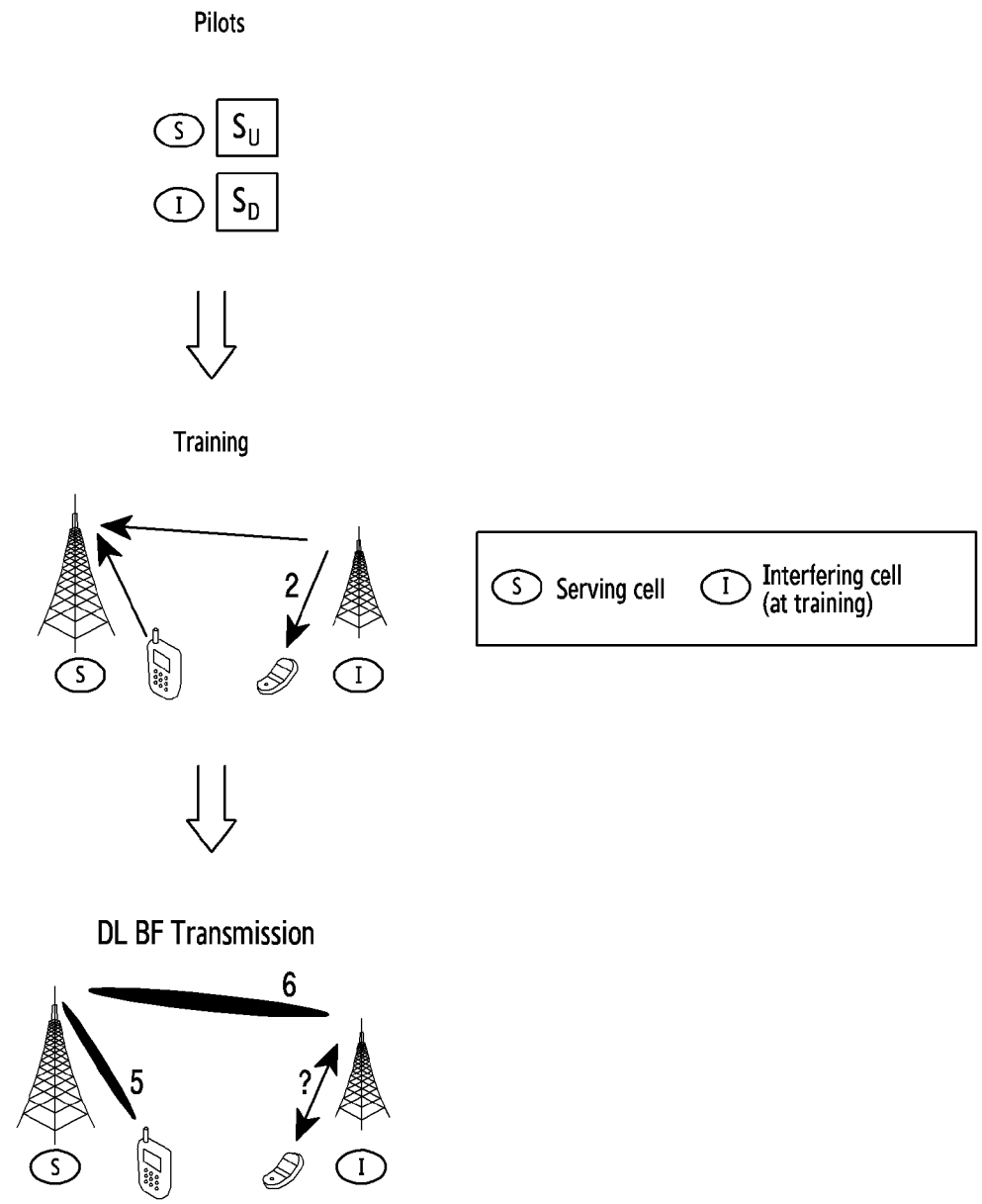

[Fig. 8]
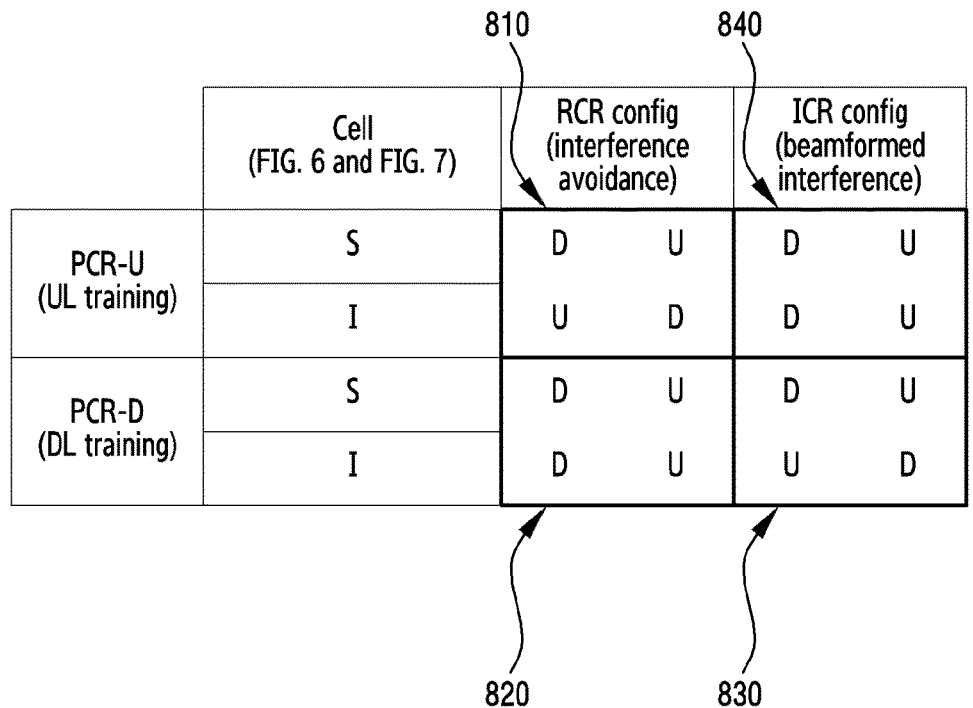
[Fig. 9]
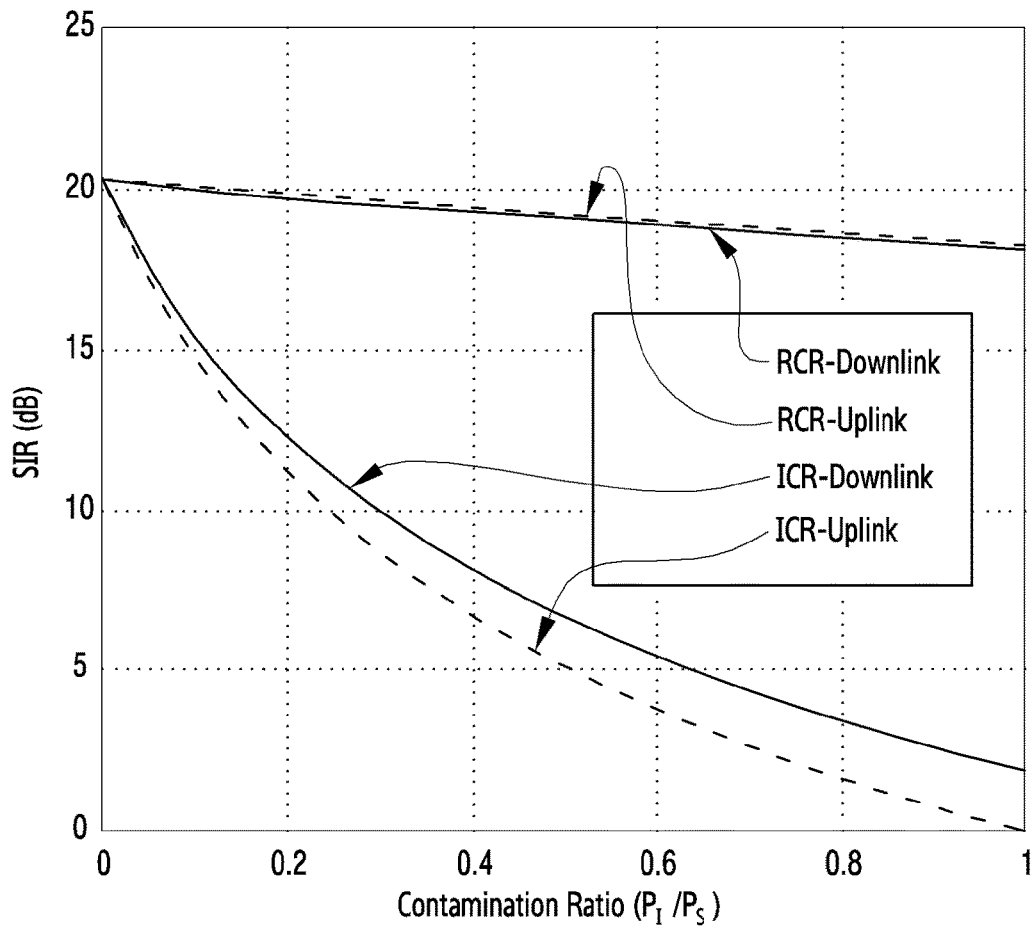

[Fig. 10]
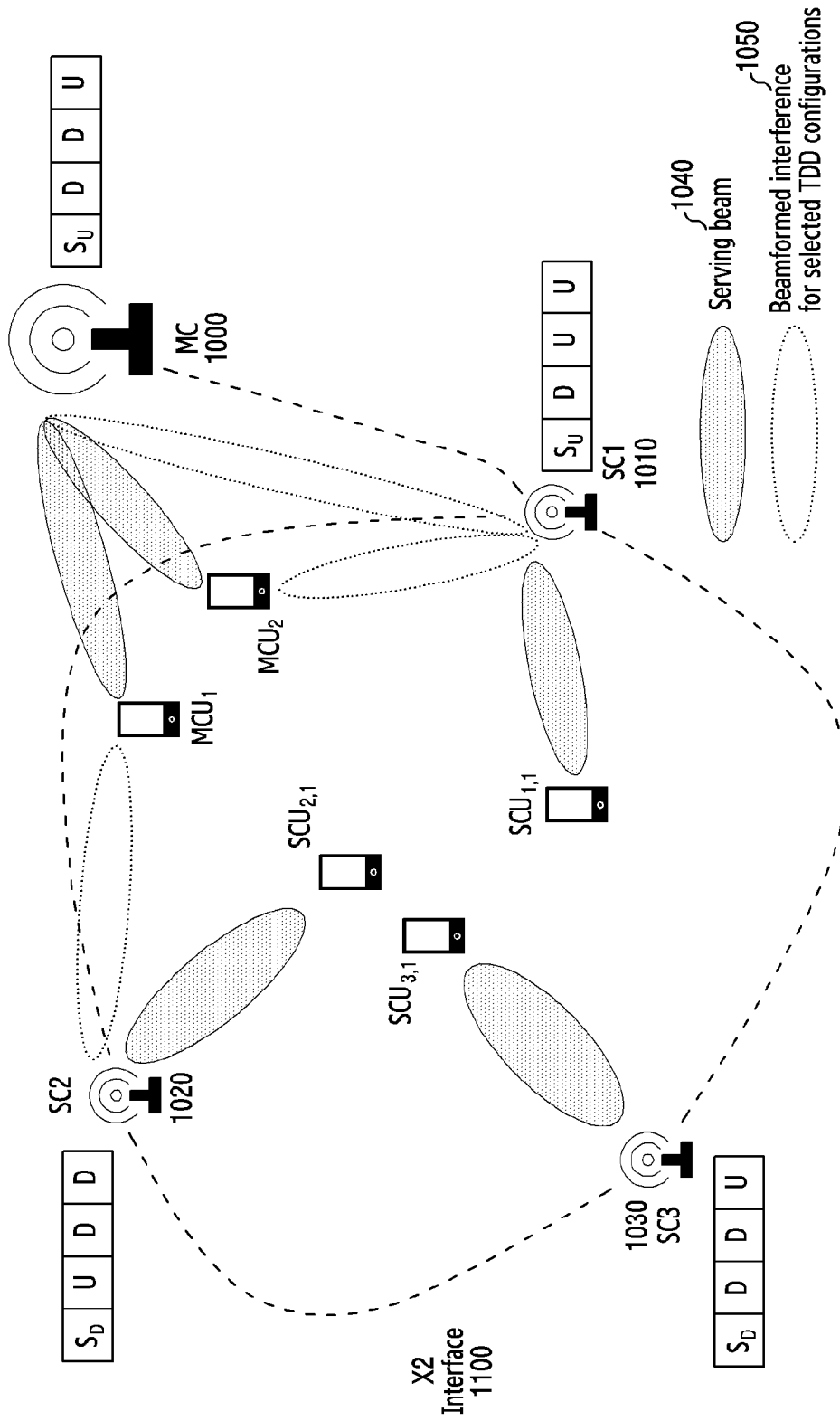

[Fig. 11]
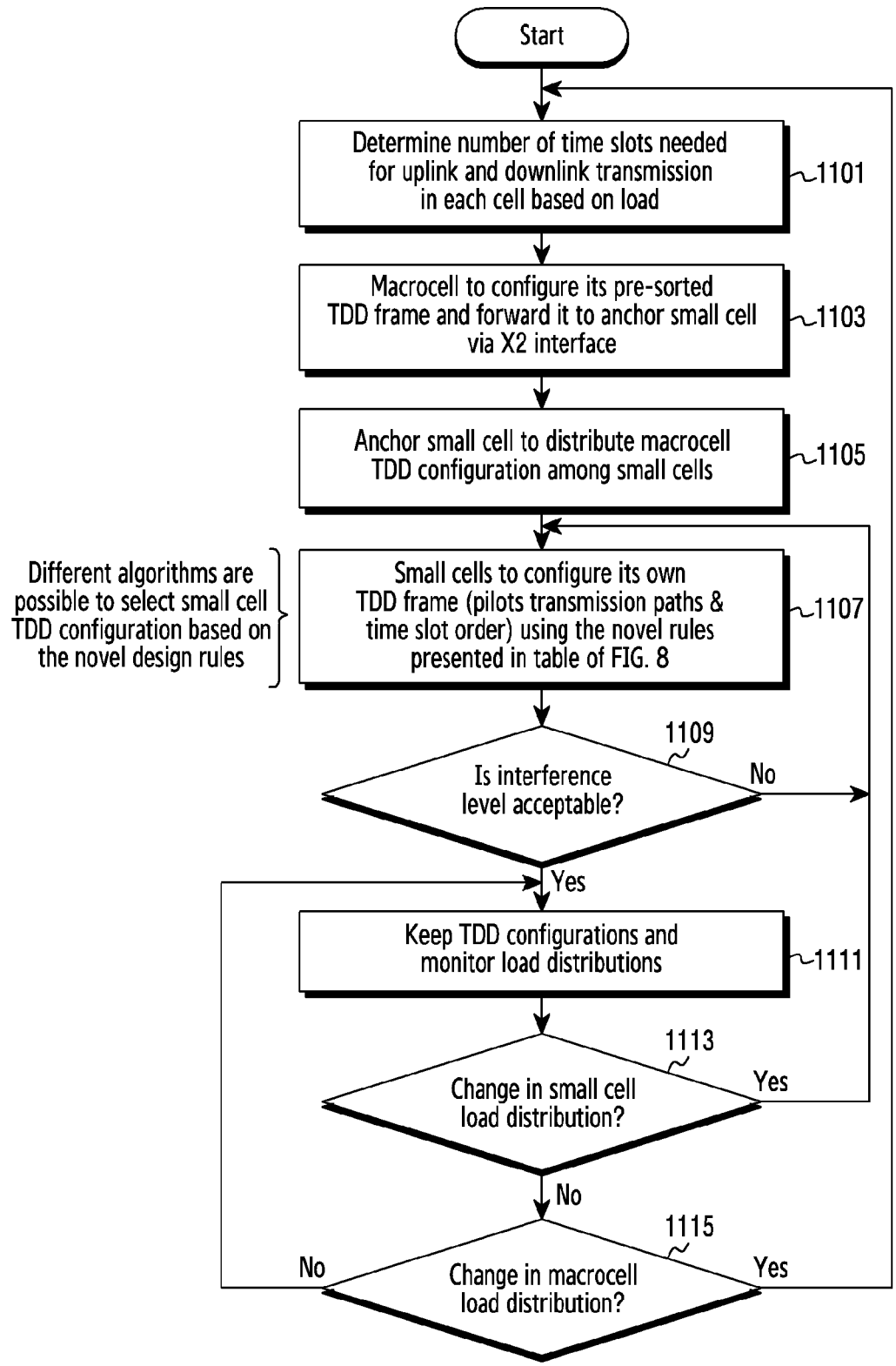

APPARATUS AND METHOD FOR INTERFERENCE MANAGEMENT IN WIRELESS COMMUNICATION SYSTEM

CROSS-REFERENCE TO RELATED APPLICATIONS

This application is a 371 National Stage of International Application No. PCT/KR2017/011013, filed Sep. 29, 2017, which claims priority to United Kingdom Patent Application No. GB 1616863.5, filed Oct. 4, 2016, and Korean Patent Application No. 10-2017-0124404, filed Sep. 26, 2017, the disclosures of which are herein incorporated by reference in their entirety.

BACKGROUND

1. Field

The present disclosure relates to wireless communication systems, and in particular to an apparatus and method for interference management in $5^{th}$ generation (5G) communication networks.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a cellular system such as the 5G system, intercell interference may occur because cells are placed adjacent to each other. For example, a signal transmitted from a neighboring base station may be received by a terminal or a base station, so that interference may occur. Since such inter-cell interference causes deterioration of communication quality, various discussions on the cause and reduction of inter-cell interference exist.

SUMMARY

Based on the above description, the present disclosure provides an apparatus and method for interference management in a wireless communication system.

Further, the present disclosure provides an apparatus and method for selecting a transmission direction of reference signals in a wireless communication system.

Further, the present disclosure provides an apparatus and method for dynamically configuring time division duplex (TDD) slots in a wireless communication system.

Further, the present disclosure provides an apparatus and method for adjusting a number of antennas used in base stations in a wireless communication system.

In accordance with an aspect of the present disclosure, A method for operating a base station in a wireless communication system comprises receiving a information on a time division duplex (TDD) configuration of another base station, determining a TDD configuration of the base station based on the TDD configuration of the another base station and transmission direction of reference signals, and transmitting a downlink signal and receiving an uplink signal according to the TDD configuration of the base station.

In accordance with an aspect of the present disclosure, an apparatus of a base station in a wireless communication comprises a backhaul communication interface configured to receive a information on a time division duplex (TDD) configuration of another base station, at least one processor configured to determine a TDD configuration of the base station based on the TDD configuration of the another base station and transmission direction of reference signals, and a transceiver configured to transmit a downlink signal and receive an uplink signal according to the TDD configuration of the base station.

In order to improve capacity in 5G networks, the use of very large arrays of antennas, i.e., massive MIMO, which typically employs more than 64 antennas, has become widespread in 5G systems, especially due its high suitability for mm-wave frequencies. A number of advantages can be potentially achieved by use of this technology. Firstly, dramatic capacity improvements can be obtained, especially when used to serve multiple users (MU-MIMO). Secondly, random matrix theory shows that the effects of uncorrelated noise and multipath fading vanish when the number of antennas grows to infinity. Finally, the directivity of the beams can be greatly improved, hence reducing side-lobe interference, and the radiated energy can be significantly reduced due to the large array gains.

Time-division duplex (TDD) systems have been shown to be a better suited duplex approach for massive MIMO system than frequency-division duplex (FDD), which for most cases needs a much larger amount of pilot overhead to operate.

Unlike FDD systems, where the uplink and downlink transmissions take place over different frequencies, TDD benefits from the property of channel reciprocity, because the same frequencies are used for both transmission paths. This means that in TDD systems, both the uplink and downlink channels can be estimated directly at the base station by using only uplink pilots, thus avoiding both the forward link and feedback overhead required by FDD systems. Moreover, flexible time division duplex (TDD) designs are currently being considered as a means of increasing the spectrum flexibility of the network by dynamically modifying the capacity split between uplink and downlink whenever the load distribution requires it. In effect, TDD systems may allocate timeslots differently between the uplink and downlink to meet differing load demands.

In addition, standalone network operation is also a key element of 5G systems. Standalone, in this context, refers to the ability of 5G small cell base stations to operate entirely on mm-wave frequencies, using techniques such as multi-connectivity or opportunistic access, but without the need for lower-frequency support from the macrocell base station (MBS). The latter is known as non-standalone access and the lower frequencies are usually employed for the transmission of control information. In practice, a standalone network may also mean that the small cells must organize by themselves without the centralizing bi-directional support of the macrocell, hence enforcing a more distributed operation.

A problem with implementations in this field falls in the area of interference management. In particular, problems are encountered with interference-related problems of pilot contamination and base-station-to-base-station (B2B) interference that arise in cellular network operating as flexible TDD systems where the small cell base stations are equipped with a very large number of antennas. The small cells operate in standalone mode, i.e., they do not exchange control information with the macrocell over lower frequencies.

In massive MIMO systems, it has been shown that a major performance limiting factor is pilot contamination, which fundamentally limits performance as it does not disappear when the number of antennas grows to infinity. Pilot contamination appears due to the channel estimation error that is caused by the reuse of non-orthogonal pilot sequences at different terminals. The particular severe effect of the pilot contamination effect in a TDD system is that the channel estimate may exhibit a strong correlation with the interfering channel, hence making this effect quite dangerous when the number of antennas is large, as the interference may end up being directed through beamforming towards a terminal or a base station that is not intended to receive that signal. This effect happens both in downlink and uplink. In addition, flexible TDD schemes introduce the problem of strong base-station-to-base-station (B2B) interference when a downlink transmission happens at the same time of an uplink transmission: The strong transmit power of a macrocell base station and a line of sight between base stations may cause highly degrading interference, making the received signal undecodable.

According to the present disclosure there is provided an apparatus and method as set forth in the appended claims. Other features of the present disclosure will be apparent from the dependent claims, and the description which follows.

Embodiments of the present disclosure provide a practical and flexible design for massive MIMO-TDD standalone networks that effectively mitigates the interference generated in this scenario. A difference with current techniques is that the former has not tackled the characteristic interference problem that arises in a deployment where both massive MIMO and flexible TDD technologies are employed. Furthermore, embodiments of the present disclosure provide a highly practical solution that leverage the intrinsic features of a flexible TDD design to combat the interference generated by the pilot contamination effect. A key feature is the selection of both the transmission path for the pilots at the small cells and the order of the downlink and uplink slots to avoid the pilot contamination effect of massive MIMO systems based on the macrocell flexible TDD configuration.

In embodiments of the present disclosure, a practical TDD design principle and a method to implement it are presented for a massive MIMO-enabled standalone network that leverages the inherent features of a flexible TDD design to mitigate both the beamformed interference caused by the pilot contamination effect and the B2B interference that appears between the small cells and the overlaying macrocell. Furthermore, the number of employed antennas at the small cell base stations may be adjusted when needed if it helps to further reduce interference. Embodiments are based on the key observation that the transmission path chosen for channel training (also known as channel estimation) by the small cell base stations plays an important role in the interference behaviour of the network, and the data slots may be configured accordingly.

Embodiments of the present disclosure leverage the flexible TDD capabilities to mitigate interference caused by pilot contamination effect in massive MIMO deployments. This means that despite introducing additional flexibility given by the freedom of arrangement for time slots, load constraints must still be satisfied. That is, the number of uplink and downlink slots is a network constraint while its order is flexible. Embodiments of the present disclosure differ from a simple TDMA-based interference avoidance scheme where a time slot with no interference is simply selected for transmission.

An apparatus and method according to various embodiments of the present disclosure enables to manage interference in a wireless communication system.

The effects obtainable by the present disclosure are not limited to the above-mentioned effects, and other effects not mentioned herein will be clearly understood by those skilled in the art from the following description.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 illustrates a flow diagram of a base station in the wireless communication system according to various embodiments of the present disclosure;

FIG. 6 illustrates an example of an interference of data transmission in accordance with interference in a training procedure in the wireless communication system according to various embodiments of the present disclosure;

FIG. 7 illustrates another example of an interference of data transmission in accordance with interference in a training procedure in the wireless communication system according to various embodiments of the present disclosure;

FIG. 8 illustrates an example of a design rule in the wireless communication system according to various embodiments of the present disclosure;

FIG. 9 illustrates a beamformed interference effect graph in the wireless communication system according to various embodiments of the present disclosure;

FIG. 10 illustrates a schematic diagram of a network configuration representing the beamformed interference in the wireless communication system according to various embodiments of the present disclosure; and FIG. 11 illustrates a flow diagram of a standalone small cell setup in the wireless communication system according to various embodiments of the present disclosure.

DETAILED DESCRIPTION

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meanings as those commonly understood by a person skilled in the art to which the present disclosure pertains. Such terms as those defined in a generally used dictionary may be interpreted as having the meanings equal to the contextual meanings in the relevant field of art, and are not to be interpreted as having ideal or excessively formal meanings unless clearly defined in the present disclosure. In some cases, even terms defined in the present disclosure should not be interpreted as excluding embodiments of the present disclosure.

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for an apparatus and method for interference management in a wireless communication system. In particular, the present disclosure relates to a technique for selecting the transmission path of pilots in a wireless communication system, dynamically configuring time division duplex (TDD) slots, and adjusting the number of antennas used in base stations.

The terms referring to a signal used in the following description, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, a base station (BS) 130, and a terminal 140 are illustrated as the part of nodes using a wireless channel in a wireless communication system. FIG. 1 illustrates only two BSs, but another BS, which is the same as or similar to the BS 110 and the BS 130, may be further included. Here, the BS 110 may be a macrocell base station, and the BS 130 may be a small cell base station subject to a beamformed interference from a macrocell base station.

The BS 110 and the BS 130 are network infrastructures that provide wireless access to the terminals 120 and 140, respectively. Each of the BS 110 and the BS 130 has coverage defined as a predetermined geographical region based on the distance at which a signal can be transmitted.

According to various embodiments, the BS 110 and the BS 130 may both provide macrocells, or at least one of the BS 110 and the BS 130 may provide a small cell. The BS 110 and the BS 130 may be referred to as "access point (AP)," "eNodeB (eNB)," "5th generation (5G) node," "wireless point," "transmission/reception Point (TRP)" as well as "base station."

Each of the terminal 120 and the terminal 140 is a device used by a user, and performs communication with the BS 110 and the BS 130 through a wireless channel, respectively. Depending on the case, at least one of the terminal 120 and the terminal 140 may operate without user involvement. That is, at least one of the terminal 120 and the terminal 140 is a device that performs machine-type communication (MTC) and may not be carried by the user. Each of the terminal 120 and the terminal 140 may be referred to as "user equipment (UE)," "mobile station," "subscriber station," "remote terminal," "wireless terminal," or "user device" as well as "terminal."

The BS 110, the terminal 120, the BS 130, and the terminal 140 may transmit and receive wireless signals in millimeter wave (mmWave) bands (for example, 28 GHz, 30 GHz, 38 GHz, and 60 GHz). At this time, in order to improve a channel gain, the BS 110, the terminal 120, the BS 130, and the terminal 140 may perform beamforming. The beamforming may include transmission beamforming and reception beamforming. That is, the BS 110, the terminal 120, the BS 130, and the terminal 140 may assign directivity to a transmission signal and a reception signal. To this end, the BS 110, the terminal 120, the BS 130, and the terminal 130 may select serving beams 112, 121, 132, and 141 through a beam search procedure or a beam management procedure. After that, communications may be performed using resources having a quasi co-located relationship with resources carrying the serving beams 112, 121, 132, and 141.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

To determine the serving beams, in the beam search or the beam management procedure, each of the BS 110, the terminal 120, the BS 130, and the terminal 140 may transmit or receive at least one reference signal. In the following description, the reference signal may be mixed with a pilot signal, a pilot, or other terms having equivalent meaning. In this case, when am interference occurs between reference signals, an error occurs in the serving beam selection, so a beamforming toward a terminal or a base station to which signal reception is not intended can be performed. That is, the BS 110, the terminal 120, the BS 130, or the terminal 140 may give unintended directionality to a transmission signal or a reception signal.

Embodiments of the invention provide a method to configure the time slots of a standalone TDD network-uplink (U) or downlink (D)—where base stations are equipped with a large number of antennas, with the objective of minimizing the interference that is generated in such a setting. The underlying concept is built on three main observations.

The pilot overhead introduced by employing downlink pilots in a TDD massive MIMO system is very high. Hence, when using a large number of antennas, channel training can be performed in the uplink pilots to avoid the costly overhead.

The pilot contamination effect may be avoided by appropriate selection of transmission path at each time slot to prevent beamformed interference affecting the terminals at other cells.

Base-station-to-base-station (B2B) interference generated by flexible TDD deployments should be prevented, as line-of-sight (LoS) channels between base stations would cause interference to be highly damaging because of the received interference power.

Embodiments of the invention consider the three main observations described above and provide a method for its implementation in a set of standalone 5G small cells (SCs). Embodiments of the invention determine which transmission path (e.g., uplink or downlink) should be used for training at the standalone small cells, and determine in which order the uplink/downlink slots should be allocated to prevent pilot contamination while matching the load distribution. In addition, embodiments of the invention determine how many antennas to use to serve the terminals in each small cell.

An interference management method for the configuration of flexible massive MIMO TDD systems for determining this is provided. The interference management method according to various embodiments can be understood as a framework that specifies the algorithm steps but leaves open for implementation many specific values of the algorithm parameters.

When non-orthogonal pilots are transmitted in the same time slots in different cells, interference may be beamformed to the elements of adjacent cells in the network. The beamformed interference makes the received signal undecodable. The apparatus and method according to various embodiments provide a method of interference management for the configuration of flexible massive MIMO TDD systems in each small cell.

FIG. 2 illustrates the BS in the wireless communication system according to various embodiments of the present disclosure. A structure exemplified at FIG. 2 may be understood as a structure of the BS 110 or the BS 130. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the controller 240 selects the transmission path of the reference signals and dynamically configures the TDD slots. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to various embodiments, the controller 330 controls to transmit or receive the reference signal according to the transmission path of the reference signals determined by the serving base station. Also, the controller 330 controls to perform the uplink and downlink communications according to the TDD configuration determined by the serving base station. The controller 330 may control the terminal to perform communication with the base station according to various embodiments described later.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

FIG. 5 illustrates a flow diagram of a base station in the wireless communication system according to various embodiments of the present disclosure. FIG. 5 illustrates a method of operation of a base station 110 or a base station 130.

Referring to FIG. 5, in step 501, the base station receives information on the TDD configuration of another base station. Here, the another base station is a base station adjacent to the base station, and can be given or received interference. For example, the base station may be a small cell base station and the another base station may be a macrocell base station with overlaying coverage. In this case, the information on the TDD configuration of the another base station may be received from the macrocell base station or received from the anchor small cell base station.

In step 503, the base station determines the TDD configuration based on the TDD configuration of the another base station and the transmission direction of the reference signal. Here, the transmission direction is at least one of an uplink and a downlink, and may be referred to as a 'transmission path'. The TDD configuration defines which of the subframes included in the frame is used for either the uplink communication or the downlink communication. According to one embodiment, the base station may determine the TDD configuration to avoid interference with the another base stations.

In step 505, the base station transmits a downlink signal and receives an uplink signal according to the determined TDD configuration. That is, the base station transmits the downlink signal during a subframe period allocated for the downlink communication according to the TDD configuration. The base station receives the uplink signal during a subframe period allocated for the uplink communication according to the TDD configuration.

In the embodiment described with reference to FIG. 5, the base station determines the TDD configuration based on the TDD configuration of the another base station and the transmission direction of the reference signal. Here, the transmission direction of the reference signal can be predetermined as a part of this procedure or before the start of this procedure. For example, the base station can determine the transmission direction of the reference signal based on a number of antennas used for the downlink communication. According to one embodiment, when the number of antennas used for the downlink communication, that is, the number of antennas to transmit the reference signal exceeds a threshold, the base station can determine the transmission direction of the reference signal as an uplink. This is because it is advantageous in terms of overhead to use an uplink reference signal when the number of antennas used for the downlink communication exceeds the threshold.

FIG. 6 illustrates an example of an interference of data transmission in accordance with interference in a training procedure in the wireless communication system according to various embodiments of the present disclosure.

FIG. 7 illustrates another example of an interference of data transmission in accordance with interference in a training procedure in the wireless communication system according to various embodiments of the present disclosure.

FIG. 6 and FIG. 7 illustrate different scenarios s assumed that the serving base station (S) uses a very large number of antennas.

FIG. 6 and FIG. 7 illustrate different scenarios and assume that the serving base station (S) in both scenarios uses a very large number of antennas. Hence, the pilots must be sent in the uplink, with these pilots being represented by Su. An interfering cell generates interference in a training phase, thereby causing pilot contamination. Also, the interfering cell may experience interference from the serving cell during a data transfer phase.

As shown in FIG. 6, the interfering cell (I) performs training, represented by arrow 1, in the uplink as well, hence creating beamformed interference directed to the terminal of the interfering cell. The beamformed interference from the serving cell (S) is represented by the signal path 4, whereas the wanted transmission is represented by signal path 3. The signal path 4 is the result of pilot contamination. When estimating the channel in the training phase, the channel component that is going to the interference cell due to the pilot contamination is included in the estimation. Thus, when precoding is applied to generate the beam, the beamformed interference is caused as shown in FIG. 6. If the interfering cell needs to use a very large array of antennas, then the time slots for data transmission should be arranged in such a way that the terminal of the interfering cell does not receive the beamformed interference coming from the serving cell.

As shown in FIG. 7, the training, represented by arrow 2, at the interfering cell (I) is performed in the downlink. That is, the number of employed antennas should be small to avoid large overhead. Data slots should then be arranged to avoid beamformed interference being received at the interfering base station. In this case, the desired transmission from serving cell (S) is represented by signal path 5 and the unwanted interference directed at the interfering cell by signal path 6. The signal path 6 is the result of the pilot contamination. When the training is performed on the different transmission paths of two cells together with the non-orthogonal pilots, that is, when the serving cell performs the training on the uplink and the interference cell performs the training on the downlink, base-station-to-base-station beamformed interference occurs.

The signal paths marked by a question mark indicate that it is a matter of design choice whether data transmission is performed in the uplink or downlink, as per embodiments of the invention.

A similar argument is valid for the uplink, where it can be seen that a combining technique such as maximum ratio combining (MRC) applied at the contaminated received signal in a massive MIMO-enabled base station may create very damaging interference because of the strong correlation that the contaminated estimated channel experiences with the interfering channel. That is, the combining technique such as maximal ratio combining uses estimates of the channel obtained in training, so that if the channel estimate is contaminated, the combiner output will generate an interfered receive beam and degrade performance. Other receivers (ZF, MMSE, IRC, etc) will also suffer from the same pilot contamination effect in the uplink although not with the same high intensity as combining receivers.

As described above, when non-orthogonal pilots are transmitted in the same time slots in different cells, interference may be beamformed to elements of adjacent cells in the network. This is shown in FIG. 6 and FIG. 7, where unwanted interference is depicted by signal paths 4 and 6. Two possibilities exist for the network element at which the interference may be beamformed, namely a terminal or a base station.

If the network element is a terminal, the pilot contamination must have occurred when the contaminating cell performed training in the uplink, hence this is termed "pilot contamination regime-uplink" (PCR-U). On the other hand, if the network element is a base station, the pilot contamination must have occurred when the contaminating cell performed training in the downlink, hence this is termed "pilot contamination regime-downlink" (PCR-D). These are shown in FIG. 6 and FIG. 7, respectively.

Both in the uplink and downlink, the problem of having a contaminated channel estimate can be severe, especially when the number of antennas is very large. However, the TDD design according to embodiments of the present disclosure, based on the scenario shown in FIG. 6 and FIG. 7, provides the flexibility to avoid the reception of a signal when a strong interfering beam is directed towards the receiver. In fact, the method to implement this interference avoidance scheme relies on selecting the appropriate transmission paths configuration given the training phase configuration of the cells.

Herein the term "Reduced Contamination Regime" (RCR) is the TDD configuration that avoids listening when directed interference exists, and "Increased Contamination Regime" (ICR) is the case when beamformed interference is indeed received. The interference can be alleviated by finding the appropriate RCR and ICR configurations for both PCR-U and PCR-D regimes. In the case of PCR-U, it is necessary to avoid the terminal that contaminated the pilot to be listening to the channel when the serving base station transmits. Hence, the D mode (data transmission on the downlink) should be avoided in the interfering cell when D is selected in the serving cell. Similarly, when the serving cell is receiving data in U mode (data transmission on the uplink) using a receiver employing some form of combining mechanism, the U mode should not be utilized in the interfering cell. Hence, when both the serving cell and the interfering cell are in the D mode, or both the serving cell and the interfering cell are in U-mode, these two configurations represent the ICR cases when operating in PCR-U. In the case of PCR-D regime, the interfering base station should not be listening (i.e., set in U mode) when the serving base station is transmitting (D mode), and a simultaneous downlink transmission of the interfering cell (D) while the serving base station is receiving data (U) would greatly degrade performance as well.

The above paragraph considers the interference caused by the pilot contamination effect, but this degradation becomes even greater in the case of B2B interference. Hence, power considerations also play a role in the classification of the different interference regimes identified above. In particular, the case of base-station-to-base-station macrocell (MC)-to-small cell interference while in ICR regime should be avoided due to the high transmission power of the macrocell base station. Furthermore, B2B macro cell-to-small cell interference while in RCR should be addressed even if no beamformed interference (i.e., pilot contamination effect) is present. For that case, an easy solution is to utilize the existing technique of enhancing the uplink power of small cell terminals as a means to compensate for the B2B interference coming from the MBS.

FIG. 8 illustrates an example of a design rule in the wireless communication system according to various embodiments of the present disclosure. In FIG. 8, each table cell represents a transmission path (Downlink D or Uplink U) in one single data slot. The table is structured as two sets of two rows each, each set (PCR-U and PCR-D) representing the transmission path over which the pilots for channel training were sent. That is, the training is performed over downlink in case of PCR-D, and uplink in case of PCR-U.

Furthermore, each row in each set represents a cell's TDD configuration during data transmission slots, where the S rows represent the serving cell and I rows represent the interfering cells during training phase. Each column represents which of the TDD configurations correspond to a well-managed interference case (RCR) that avoids beamformed interference and which correspond to a beamformed interference case (ICR). The division by quadrants of the table visually allows a prioritized classification of the different possible TDD modes. RCR is preferred over ICR for the pilot contamination reasons previously stated.

Within RCR, the PCR-U mode (quadrant 810) does not require any modification of the transmit powers while PCR-D (quadrant 820) requires the enhancement of the uplink transmit power of small cell users to counteract the B2B interference characteristic of reverse TDD mode.

In the case of ICR, the PCR-D mode (quadrant 830) suffers from beamformed interference but it is preferred over PCR-U (quadrant 840) as the latter adds B2B interference to pilot contamination. Hence, the TDD configuration of the cells in a Heterogeneous Network (HetNet) should be set following this quadrant priority order: i) quadrant 810, ii) quadrant 820, iii) quadrant 830, and iv) quadrant 840. This allows the TDD configuration to be designed to mitigate the critical pilot contamination effect of massive MIMO systems.

In other embodiments, a simple case of two cells operating under pilot contamination is assumed where one cell acts as the serving cell and the second cell as interferer. A two-base station scenario is assumed with one terminal each, sharing the same pilot sequence. The serving base station is equipped with a very large array of antennas. The simulation is restricted to two time slots: a training phase, followed by a data transmission phase. In assessing the performance difference between RCR and ICR when pilot contamination exists, it is assumed that the serving base station gets its channel estimate contaminated by interfering pilots carried in the downlink (PCR-D). Then, the signal-to-interference ratio (SIR) is measured during the data transmission slot at the receiving ends, namely the interfered terminal in the case of downlink transmission, and the serving base station in the case of uplink transmission. The results are displayed in FIG. 9. The SIRs (y-axis) are measured for different contamination ratios (x-axis), where the contamination ratio is defined as the quotient between the received serving power and the received interfering power during the training phase.

The main conclusions that can be extracted from the graphs are as follows. Clearly, the pilot contamination effect degrades SIRs both in the downlink and uplink when beamforming and combining are respectively employed. Also, selecting the RCR configuration over ICR greatly increases the SIR of both downlink and uplink transmissions. Furthermore, the contamination ratio plays an important role. That is, when the power level of the contamination is high, the beamformed interference experienced at the users increases, hence enlarging the SIR gap between RCR and ICR. This observation is important when designing a TDD configuration for a HetNet since beamformed interference coming from high-power elements is much more dangerous than the interference coming from low-power elements. In summary, it can be observed that the design of the TDD configuration is an important parameter to control interference in massive MIMO systems.

Embodiments of the present disclosure provide a paradigm to configure the flexible TDD frames of a set of 5G standalone small cells based on the observation and the design rules presented earlier, and a procedure to support the implementation of the design paradigm in a standalone network. It is important to note that various embodiments are possible in the algorithmic way that the design principles are applied to configure the TDD frame in each small cell. However, common to all of them is the fact that it must be done according to the macrocell's TDD configuration, the load distribution of each cell, and the design rules described above to prevent interference. These mentioned features form important features of embodiments of the present disclosure and serve to differentiate them from prior art solutions.

A standlone set of small cells differentiates itself from a non-standlone set in that no wireless low-frequency assistance is provided to terminals in the small cells (usually in the form of control information through a multi-connectivity leg). Hence, the macrocell will not receive reported information on those terminals (such as interference levels) that could be used to re-configure the macrocell's flexible TDD frame.

FIG. 10 illustrates a schematic diagram of a network configuration representing the beamformed interference in the wireless communication system according to various embodiments of the present disclosure. As shown in FIG. 10, a X2 interface 1100 is considered to exist between an anchor small cell SC1 1010 and the macrocell 1000, which could be 5G-enabled as well, to forward the TDD configuration of the macrocell. FIG. 10 shows the scenario for an embodiment of the present disclosure, where macrocell MC 1000 and small cells SCx—1010, 1020, 1030 all have a different TDD configuration based on their load distribution. Applying the earlier described findings to their randomly selected TDD configurations yields beamformed interference (shown with dotted outline) 1050 between the macrocell MC 1000 and small cell SC1 1010 and small cell SC2 1020, respectively, as shown in FIG. 10. Also shown is an intended serving beam 1040 between each base station and the terminal.

The interference management method according to an embodiment of the present disclosure follows a set of steps to dynamically configure the TDD slots of the standalone small cells. Basically, the steps comprise:

macrocell sets up its TDD configuration and shares it with anchor small cell; anchor cell distributes it to the rest of standalone small cells; each small cell calls an algorithm based on the above design rules to configure its own TDD frame; the level of interference at each small cell is independently checked and if necessary its TDD configuration is modified; and the procedure is repeated until the small cells or macrocell load distributions change.

FIG. 11 illustrates a flow diagram of a standalone small cell setup in the wireless communication system according to various embodiments of the present disclosure. As noted in the FIG. 11, each small cell is in charge of configuring its own flexible TDD frame using as input the TDD frame configuration of the macrocell and its load distribution (i.e., a number of time slots that need to be dedicated to uplink and downlink).

Referring to FIG. 3, in step 1101, each cell determines the number of time slots needed for uplink and downlink transmission based on a load calculation. That is, the load calculation is made on a per-cell basis to determine the optimum number of time slots needed for uplink and downlink transmissions.

In step 1103, the macro-cell configures its pre-sorted TDD frames and forwards the information to the anchor small cell via the X2 interface. The anchor small cell in this case is SC1 1010 and the role of the anchor cell is to distribute to the rest of the small cells the TDD configuration information of the macrocell, so that they can configure their own TDDs accordingly. That is, in step 1105, the anchor small cell SC1 1010 distributes the macrocell TDD configuration to the other small cells 1020, 1030.

In step 1107, each small cell 1010, 1020, 1030 configures its own TDD frame (i.e. pilots transmission path and time slot order) according to the novel rules presented in particular in the table in FIG. 8. That is, a transmission path (uplink or downlink) in which channel training is to be performed is determined according to a number of transmission antennas, and a transmission path (downlink D or uplink U) in a single data slot capable of avoiding interference is determined. Different algorithms can select a small cell TDD configuration based on new design rules.

In step 1109, a determination is made of the interference level and if this is acceptable. Here, the interference level determination can use a signal-to-interference ratio (SIR). The signal-to-interference ratio is measured in a data transmission slot at the receiving end, that is, at the serving base station in the case of downlink transmission and in the case of the uplink transmission. If the interference level is not acceptable, step 1107 is repeated and the determination in step 1109 is repeated. If, in step 1109, the determination is that the interference level is acceptable, then in step 1111, the TDD configurations are maintained and the load distributions between uplink and downlink are monitored.

In step 1113, a determination is made whether there has been a change in load distributions. If so, flow returns to step 1107, where the small cells reconfigure the TDD frames. If there is no change is small cell load distribution, then a further check is made at step 1115 whether there has been a change in macrocell load distribution. If so, flow returns to the start and the entire process is repeated. If not, the flow returns to step 1111.

The specific design of step 1107 can be performed based on the new design rules of the various algorithms. Various embodiments according to the present disclosure are presented.

In one embodiment, the algorithm is designed with the target of providing a low complexity solution for the configuration of the TDD frame in each small cell while respecting the above design principles. In particular, the algorithm may dynamically match the load distribution while minimizing the number of instances of beamformed interference (ICR cases in FIG. 8) between the macrocell and the small cell using the following approach. First, it induces either PCR-D or PCR-U modes, whichever is more suitable depending on the number of transmit antennas at the small cell base station, with the purpose of minimizing the impact of the pilot contamination effect. Using <equation 1>, the instances of beamformed interference (collision, C) can then be calculated both in PCR-D and PCR-U modes by properly sorting the uplink and downlink slots.

$$C^{PCR-D} = N - [\min(n_D^S, n_D^I) + \min(n_U^S, n_U^I)]$$

$$C^{PCR-U} = N - [\min(n_D^S, n_U^I) + \min(n_U^S, n_D^I)] \qquad \text{Equation 1}$$

Where $C^{PCR-D}$ is the number of instances of beamformed interference in the PCR-D mode, $C^{PCR-U}$ is the number of instances of beamformed interference in the PCR-U mode, N is the total number of time slots in the frame, n is the number of time slots, the superscript S represents the serving cell and the superscript I represents the interfering cell.

In addition, power considerations are taken into account to favour PCR-D when no collision exists while favouring PCR-U if a collision is unavoidable. The algorithm comprises, calculating PCR-D collisions using <equation 1> at each small cell, discarding if B2B interference appears, calculating PCR-U collisions, selecting mode with lesser number of collisions, prioritizing PCR-D for equal collisions as less power is needed, and configuring sorted data slots accordingly.

In another embodiment, the above algorithm can be adapted to include a modification of the number of employed transmit antennas at the small cell base stations to enable performing the training phase using downlink pilots without incurring too much overhead. This approach would introduce an additional level of flexibility for massive- MIMO enabled small cells that are otherwise forced to transmit pilot signals in the uplink.

In a still further embodiment, the algorithm may introduce priorities to certain cells and to the non-occurrence of B2B interference, employing enhanced uplink power in uplink slots if necessary.

Other embodiments within the scope of the present disclosure may be envisaged by the skilled person, utilizing the same design principles so that pilot contamination effect and B2B interference are both avoided.

Embodiments of this present disclosure do not concern themselves with inter-small-cell interference, as with fewer terminals per cell, the pilots will most likely be orthogonal to each other, and the pilot contamination effect will not generally be present.

Attention is directed to all papers and documents which are filed concurrently with or previous to this specification in connection with this present disclosure and which are open to public inspection with this present disclosure, and the contents of all such papers and documents are incorporated herein by reference.

All of the features disclosed in this present disclosure (including any accompanying claims, abstract and drawings), and/or all of the steps of any method or process so disclosed, may be combined in any combination, except combinations where at least some of such features and/or steps are mutually exclusive.

Each feature disclosed in this present disclosure (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method for operating a base station in a wireless communication system, the method comprising:
    receiving information on a first time division duplex (TDD) configuration of another base station;
    determining a transmission direction of reference signals based on a number of antennas used for downlink communication in the base station;
    determining a second TDD configuration of the base station based on the first TDD configuration and the transmission direction of the reference signals of the base station; and
    transmitting a downlink signal and receiving an uplink signal according to the second TDD configuration.

2. The method of claim 1, wherein the receiving the information on the first TDD configuration comprises:
    receiving the information on the first TDD configuration from an anchor base station received the first TDD configuration information from the other base station.

3. The method of claim 1, further comprising:
    measuring an interference level; and
    adjusting the second TDD configuration based on the interference level.

4. The method of claim 1, further comprising:
    monitoring a load distribution; and
    adjusting the second TDD configuration based on the monitoring of the load distribution.

5. The method of claim 4, further comprising:
    receiving the information on the first TDD configuration adjusted based on the load distribution monitoring in the other base station; and
    adjusting the second TDD configuration based on the adjusted first TDD configuration and the transmission direction of the reference signals.

6. The method of claim 1, further comprising:
    determining a first number of instances of collision when the transmission direction of the reference signals is a downlink and a second number of instances of collision when the transmission direction of the reference signals is an uplink; and
    determining the transmission direction corresponding to a smaller one of the first number of instances of collision and the second number of instances of collision.

7. The method of claim 4, wherein the monitoring the load distribution comprises:
    determining whether a number of time slots for each of uplink transmissions and downlink transmissions based on a load calculation is changed.

8. The method of claim 6, further comprising:
    determining the downlink as the transmission direction if the first number of instances of collision and the second number of instances of collision are equal.

9. The method of claim 8, further comprising:
    changing a number of transmit antennas used to select the transmission direction as the downlink.

10. A base station in a wireless communication, the base station comprising:
    a backhaul communication interface configured to receive information on a first time division duplex (TDD) configuration of another base station;
    at least one processor configured to:
        determine a transmission direction of reference signals based on a number of antennas used for downlink communication in the base station, and
        determine a second TDD configuration of the base station based on the first TDD configuration and the transmission direction of the reference signals of the base station; and
    a transceiver configured to transmit a downlink signal and receive an uplink signal according to the second TDD configuration.

11. The base station of claim 10, wherein the backhaul communication interface, in order to receive the information on the first TDD configuration, is further configured to:
    receive the information on the first TDD configuration from an anchor base station received the first TDD configuration information from the other base station.

12. The base station of claim 10, wherein the at least one processor is further configured to:
    measure an interference level, and
    adjust the second TDD configuration based on the interference level.

13. The base station of claim 10, wherein the at least one processor is further configured to:
    monitor a load distribution, and
    adjust the second TDD configuration based on the monitoring of the load distribution.

14. The base station of claim 13, wherein the backhaul communication interface is further configured to receive the information on the first TDD configuration adjusted based on the load distribution monitoring in the other base station, and
    wherein the at least one processor is further configured to adjust the second TDD configuration based on the adjusted first TDD configuration and the transmission direction of the reference signals.

15. The base station of claim 10, wherein the at least one processor is further configured to:
    determine a first number of instances of collision when the transmission direction of the reference signals is a downlink and a second number of instances of collision when the transmission direction of the reference signals is an uplink, and
    determine the transmission direction corresponding to a smaller one of the first number of instances of collision and the second number of instances of collision.

16. The base station of claim 13, wherein the at least one processor is further configured to:
    determine whether a number of time slots for each of uplink transmissions and downlink transmissions based on a load calculation is changed.

17. The base station of claim 15, wherein the at least one processor is further configured to:
    determine the downlink as the transmission direction if the first number of instances of collision and the second number of instances of collision are equal.

18. The base station of claim 17, wherein the at least one processor is further configured to:
    change a number of transmit antennas used to select the transmission direction as the downlink.

* * * * *